US009674983B2

(12) United States Patent
Huang et al.

(10) Patent No.: US 9,674,983 B2
(45) Date of Patent: Jun. 6, 2017

(54) TOOL-LESS AIR BAFFLE

(71) Applicant: Dell Products L.P., Round Rock, TX (US)

(72) Inventors: Chin-An Huang, Taipei (TW); Chen-Fa Wu, Tao-Yuan (TW); Shin-Chi Hsieh, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/930,052

(22) Filed: Nov. 2, 2015

(65) Prior Publication Data

US 2017/0127562 A1     May 4, 2017

(51) Int. Cl.
*G06F 1/20* (2006.01)
*H05K 7/20* (2006.01)

(52) U.S. Cl.
CPC ..... *H05K 7/20145* (2013.01); *H05K 7/20154* (2013.01)

(58) Field of Classification Search
CPC ................. H05K 7/20145; H05K 7/20154
USPC .................................................... 361/679.51
See application file for complete search history.

(56) References Cited

U.S. PATENT DOCUMENTS

| 8,102,651 | B2 * | 1/2012 | Bland | G06F 1/20 361/694 |
|---|---|---|---|---|
| 8,570,740 | B2 * | 10/2013 | Cong | G06F 1/20 361/679.49 |
| 8,659,891 | B2 * | 2/2014 | Huang | G06F 1/20 361/679.5 |
| 2006/0146494 | A1 * | 7/2006 | Chiu | H05K 7/20172 361/694 |
| 2008/0117589 | A1 * | 5/2008 | Carrera | G06F 1/20 361/679.51 |
| 2011/0141688 | A1 * | 6/2011 | Li | G06F 1/20 361/679.51 |
| 2013/0155625 | A1 * | 6/2013 | Yin | G06F 1/20 361/720 |
| 2014/0118935 | A1 * | 5/2014 | Guan | H05K 7/20727 361/694 |

* cited by examiner

*Primary Examiner* — Nidhi Thaker
(74) *Attorney, Agent, or Firm* — Jackson Walker L.L.P.

(57) ABSTRACT

In accordance with embodiments of the present disclosure, an information handling system may include heat-rejecting media thermally coupled to one or more information handling resources, a connector for receiving a modular information handling resource, the connector having a latch for facilitating insertion or removal of the modular information handling resource to or from the connector, and a removable baffle for directing a flow of air proximate to the heat-rejecting media. The removable baffle may have two substantially planar sides and an edge substantially perpendicular to the two planar sides, such that when the removable baffle is located within a chassis including the heat-rejecting media and the connector, the latch engages with the edge to mechanically maintain a location of the removable baffle within the chassis.

14 Claims, 3 Drawing Sheets

TOOL-LESS AIR BAFFLE

TECHNICAL FIELD

The present disclosure relates in general to information handling systems, and more particularly to a tool-less air baffle for use in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components. In addition, baffles are also often used direct air flow from air movers to concentrate air flow to those components requiring air cooling. Under many traditional approaches, such baffles are often attached via a screw or an adhesive to a chassis.

SUMMARY

In accordance with the teachings of the present disclosure, the disadvantages and problems associated with heat transfer from information handling resources of an information handling system to an enclosure thereof may be substantially reduced or eliminated.

In accordance with embodiments of the present disclosure, an information handling system may include heat-rejecting media thermally coupled to one or more information handling resources, a connector for receiving a modular information handling resource, the connector having a latch for facilitating insertion or removal of the modular information handling resource to or from the connector, and a removable baffle for directing a flow of air proximate to the heat-rejecting media. The removable baffle may have two substantially planar sides and an edge substantially perpendicular to the two planar sides, such that when the removable baffle is located within a chassis including the heat-rejecting media and the connector, the latch engages with the edge to mechanically maintain a location of the removable baffle within the chassis.

In accordance with these and other embodiments of the present disclosure, a baffle for directing a flow of air proximate to the heat-rejecting media may include two substantially planar sides and an edge substantially perpendicular to the two planar sides, the edge shaped and sized such that when the baffle is located within a chassis for housing information handling resources, a latch of a connector for receiving an information handling resource engages with the edge to mechanically maintain a location of the baffle within the chassis.

In accordance with these and other embodiments of the present disclosure, a method for forming a baffle for directing a flow of air proximate to heat-rejecting media may include forming a portion of the baffle to have two substantially planar sides and an edge substantially perpendicular to the two planar sides and shaping and sizing the portion such that when the baffle is located within a chassis for housing information handling resources, a latch engages of a connector for receiving an information handling resource engages with the edge to mechanically maintain a location of the baffle within the chassis.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
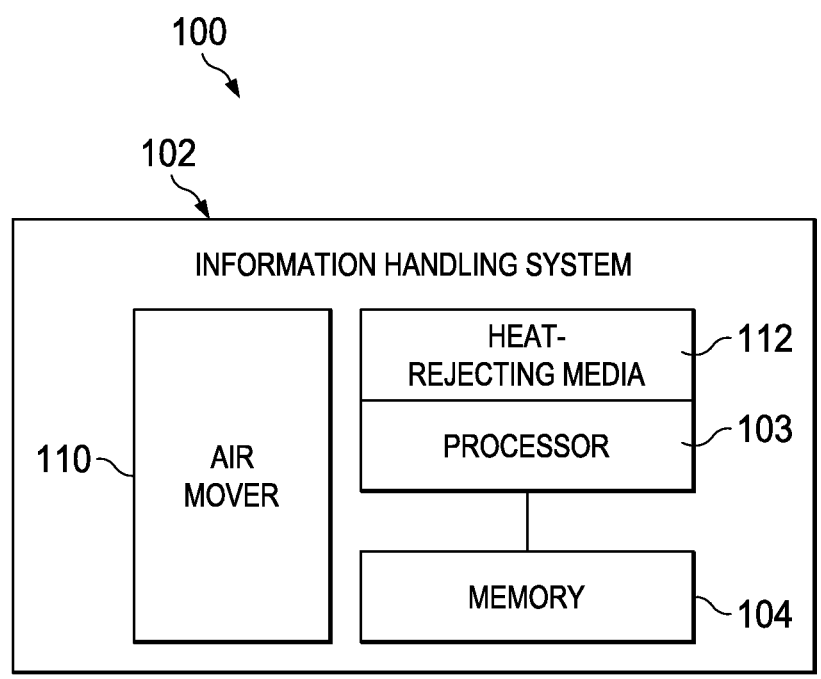
FIG. 1 illustrates a block diagram of an example information handling system, in accordance with embodiments of the present disclosure.
Figure 2:
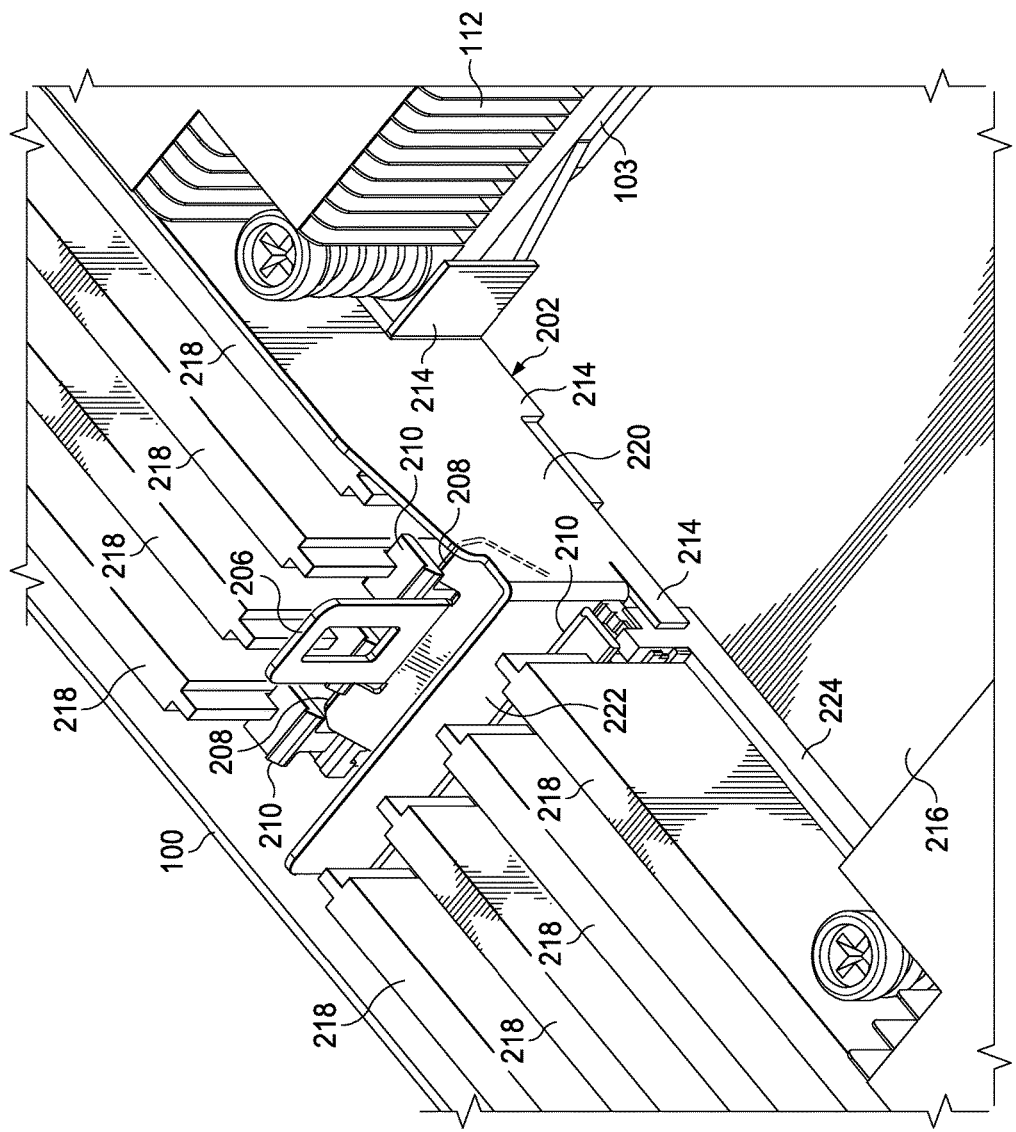
FIG. 2 illustrates a perspective view of selected components of an example information handling system with a portion of a chassis removed, in accordance with embodiments of the present disclosure.
Figure 3:
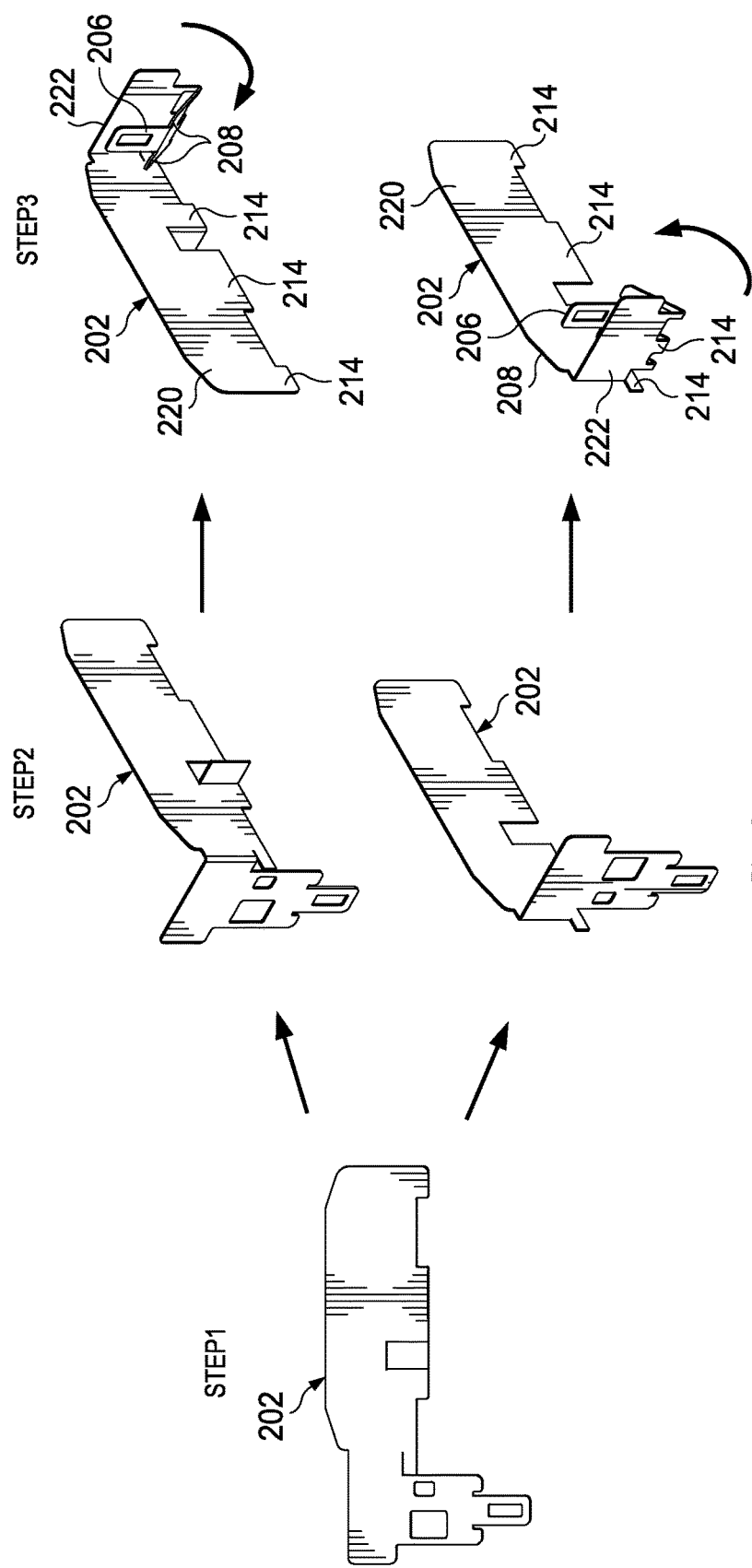
FIG. 3 illustrates a method for forming two differently shaped baffles from a single piece of material, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a chassis 100 housing a plurality of information handling resources including, without limitation, processor 103, a memory 104 communicatively coupled to processor 103, an air mover 110, and heat-rejecting media 112 thermally coupled to processor 103.

Chassis 100 may comprise an enclosure that serves as a container for various information handling systems and/or information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

An air mover 110 may include any mechanical or electro-mechanical system, apparatus, or device operable to move air and/or other gases. In some embodiments, an air mover 110 may comprise a fan (e.g., a rotating arrangement of vanes or blades which act on the air). In other embodiments, an air mover 110 may comprise a blower (e.g., a centrifugal fan that employs rotating impellers to accelerate air received at its intake and change the direction of the airflow). In these and other embodiments, rotating and other moving components of air mover 110 may be driven by a motor. The rotational speed of such motor may be controlled by suitable control signals communicated from processor 103 or a controller of air mover 110 in communication with processor 103. In operation, air mover 110 may cool information handling resources of information handling system 102 by drawing cool air into enclosure 100, expelling warm air from inside the enclosure to the outside of such enclosure, and/or move air across heat-rejecting media 112 internal to enclosure 100 to cool one or more information handling resources (e.g., processor 103).

Heat-rejecting media 112 may include any system, device, or apparatus configured to transfer heat from an information handling resource, thus reducing a temperature of the information handling resource. For example, heat-rejecting media 112 may include a fluid conveyed proximate to an information handling resource (e.g., air conveyed by a fan or blower, liquid conveyed via a liquid conduit by a pump, etc.), or a solid thermally coupled to the information handling resource (e.g., heatpipe, heat spreader, heatsink, fin-stack, etc.).

In addition to processor 103, memory 104, and air mover 110, information handling system 102 may include one or more other information handling resources.

FIG. 2 illustrates a perspective view of selected components of example information handling system 102 with a portion of a chassis 100 removed, in accordance with certain embodiments of the present disclosure. As shown in FIG. 2, a removable baffle 202 may be placed within chassis 100 in order to direct airflow from air mover 110 (not shown in FIG. 2) over components of information handling system 102 (including heat-rejecting media 112 thermally coupled to processor 103). In addition, when placed in chassis 100, baffle 202 may prevent airflow to a region of the chassis 100 that houses memory 104, which is shown in FIG. 2 as being embodied as memory modules 218 (e.g., dual in-line memory modules or "DIMMs"). Such memory modules 218 may each be populated in a corresponding connector 224 wherein each connector may have a latch 210, as is known in the art, for facilitating insertion and/or removal of a memory module 218.

Also as depicted in FIG. 2, baffle 202 may include a first portion 220 and a second portion 222 mechanically coupled to first portion 220 in a manner such that second portion 222 includes two substantially planar sides that are generally perpendicular to two substantially planar sides of first portion 220. However, other suitable geometries consistent with this disclosure may be used. Second portion 222 may also include a handle 206 formed therein or coupled thereto that allows a person to use such person's hand to insert and/or remove baffle 202 from chassis 100. In some embodiments, some or all of first portion 220, second portion 222, and handle 206 may be formed from the same piece of material (e.g., biaxially-oriented polyethylene terephthalate or BoPET, which is often referred to by its tradename MYLAR).

Baffle 202 may also be constructed to have a top edge 208 substantially perpendicular to the two substantially planar sides of second portion 222, and second portion 222 may have a geometry such that, when baffle 202 is placed in chassis 100, one or more latches 210 may mechanically engage with top edge 208, in order to secure baffle 202 within chassis 100. In some embodiments, handle 206 may be sized and shaped such that top edge 208 may engage with a latch 210 within an opening of handle 206, or on the sides of handle 206 proximate to handle 206. In addition, handle 206 and top edge 208 may be shaped (e.g., angled) such that they may engage with latches 210 that differ in height. Furthermore, baffle 202 may also have guiding features 214 extending from and/or formed in first portion 220 or second portion 222 that may mechanically engage with one or more components (e.g., motherboard 216, one or more connectors 224, heat-rejecting media 112, etc.) to guide insertion into and/or removal from chassis 100.

In some embodiments, handle 206 may be configured such that it may be manipulated (e.g., pressed or pulled) by a user for engaging baffle 202 with a latch 210 and/or disengaging baffle 202 from a latch.

Advantageously, as so sized and shaped, baffle 202 may be readily inserted into and/or removed from its location within chassis 100 without the need of tools, fasteners, or mounting features, due to the fact that its location may be mechanically maintained by locating features 214 and a latch 210 associated with a connector 224 for receiving a memory module 218 or another information handling resource.

FIG. 3 illustrates a method for forming one of two differently shaped baffles 202 from substantially identical pieces of material, in accordance with embodiments of the present disclosure. Although not shown in FIG. 2, the orientation of other components relative to processor 103 may be symmetrical to that shown in FIG. 2, such that, for example, an additional baffle 202 and additional memory modules 218 are also present in chassis 100 in a manner substantially symmetrical to the configuration shown in FIG. 2. FIG. 3 shows that such symmetrical baffles 202 may each be formed from substantially identical pieces of material. Starting from a single piece of material as shown in step 1, such piece of material may be folded in different manners as shown in steps 2 and 3 such that, if folded in one way, it may have one shape and if folded another way, it may have a substantially symmetrical shape.

As used herein, when two or more elements are referred to as "coupled" to one another, such term indicates that such two or more elements are in electronic communication, thermal communication, or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   heat-rejecting media thermally coupled to one or more information handling resources;
   a connector for receiving a modular information handling resource, the connector having a latch for facilitating insertion or removal of the modular information handling resource to or from the connector; and
   a removable baffle for directing a flow of air proximate to the heat-rejecting media, wherein the removable baffle has two substantially planar sides, an edge substantially perpendicular to the two planar sides, and a handle coupled to and extending from the edge, such that when the removable baffle is located within a chassis including the heat-rejecting media and the connector, the latch engages with the edge to mechanically maintain a location of the removable baffle within the chassis, and wherein the handle and the edge are shaped such that the edge is capable of engaging with latches of different heights.

2. The information handling system of claim 1, wherein the removable baffle further comprises one or more locating features configured to engage with one or more components of the chassis to mechanically maintain the location of the removable baffle within the chassis.

3. The information handling system of claim 1, wherein the removable baffle is formed from a single piece of material.

4. The information handling system of claim 1, wherein the removable baffle is formed from biaxially-oriented polyethylene terephthalate.

5. The information handling system of claim 1, wherein the connector comprises a connector for receiving a memory module.

6. The information handling system of claim 1, wherein the heat-rejecting media comprises a heat sink.

7. A baffle for directing a flow of air proximate to heat-rejecting media, the baffle comprising:
   two substantially planar sides;
   an edge substantially perpendicular to the two planar sides; and
   a handle coupled to and extending from the edge;
   wherein:

the edge is shaped and sized such that when the baffle is located within a chassis for housing information handling resources, a latch of a connector for receiving an information handling resource engages with the edge to mechanically maintain a location of the baffle within the chassis; and the handle and the edge are shaped such that the edge is capable of engaging with latches of different heights.

8. The baffle of claim 7, further comprising one or more locating features configured to engage with one or more components of the chassis to mechanically maintain the location of the baffle within the chassis.

9. The baffle of claim 7, wherein the baffle is formed from a single piece of material.

10. The baffle of claim 7, wherein the baffle is formed from biaxially-oriented polyethylene terephthalate.

11. A method for forming a baffle for directing a flow of air proximate to heat-rejecting media, the method comprising: forming a portion of the baffle to have two substantially planar sides, an edge substantially perpendicular to the two planar sides, and a handle coupled to and extending from the edge; shaping and sizing the portion such that when the baffle is located within a chassis for housing information handling resources, a latch of a connector for receiving an information handling resource engages with the edge to mechanically maintain a location of the baffle within the chassis; and shaping the handle and the edge such that the edge is capable of engaging with latches of different heights.

12. The method of claim 11, further comprising forming one or more locating features configured to engage with one or more components of the chassis to mechanically maintain the location of the baffle within the chassis.

13. The method of claim 11, wherein forming comprises forming the baffle from a single piece of material.

14. The method of claim 11, wherein forming comprises forming the baffle from biaxially-oriented polyethylene terephthalate.

* * * * *